United States Patent [19]
Shade

[11] Patent Number: 5,383,693
[45] Date of Patent: Jan. 24, 1995

[54] GASKETS USED IN JOINING CORRUGATED PIPE

[75] Inventor: James W. Shade, Middletown, Ohio

[73] Assignee: Contech Construction Products, Inc., Middletown, Ohio

[21] Appl. No.: 897,365

[22] Filed: Jun. 11, 1992

[51] Int. Cl.$^6$ .............................................. F16L 17/02
[52] U.S. Cl. ................................... 285/373; 285/903; 285/910; 277/213
[58] Field of Search ............... 285/373, 419, 236, 910, 285/903; 277/101, 207 R, 207 A, 235 R, 213

[56] References Cited

U.S. PATENT DOCUMENTS

| 2,210,833 | 8/1940 | Clough | 285/910 X |
| 3,086,555 | 4/1963 | Smith | 277/101 |
| 3,355,181 | 11/1967 | Olson | 277/180 |
| 3,830,261 | 8/1974 | Hochberg et al. | 138/127 |
| 4,124,236 | 11/1978 | Guidry | 285/373 |
| 4,171,834 | 10/1979 | Abner | 285/903 X |
| 4,176,865 | 12/1979 | Felton et al. | 285/373 |
| 4,657,287 | 4/1987 | Nimke | 285/373 |
| 4,702,502 | 10/1987 | Shade et al. | 285/903 X |
| 4,871,198 | 10/1989 | Hattori et al. | 285/903 X |
| 5,039,137 | 8/1991 | Cankovic et al. | 285/236 |
| 5,072,972 | 12/1991 | Justice | 285/373 |

FOREIGN PATENT DOCUMENTS

| 0310177 | 4/1989 | European Pat. Off. | 285/373 |
| 1106666 | 12/1955 | France | 277/213 |
| 23213115 | 3/1975 | Germany | 285/236 |
| 1006832 | 3/1983 | U.S.S.R. | 277/213 |

OTHER PUBLICATIONS

Three Contech Construction Products, Inc. pamphlets.

Primary Examiner—Randolph A. Reese
Assistant Examiner—Heather Chun
Attorney, Agent, or Firm—Wood, Herron & Evans

[57] ABSTRACT

A profile gasket adapted for forming a seal in a joint between an annular band and annularly grooved ends of two pipes positioned end-to-end. The profile gasket comprises a sheet of elastomeric material having a bottom surface with at least two integrally molded and laterally spaced ridges running along its length.

8 Claims, 2 Drawing Sheets

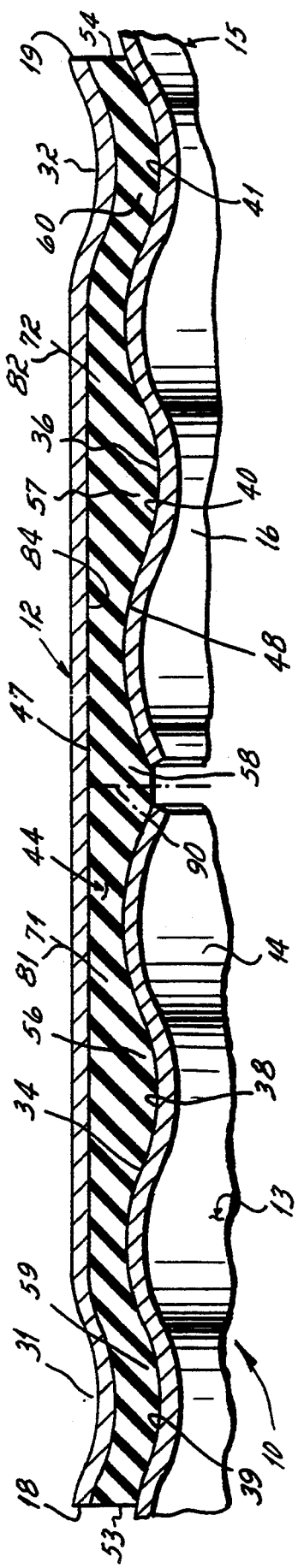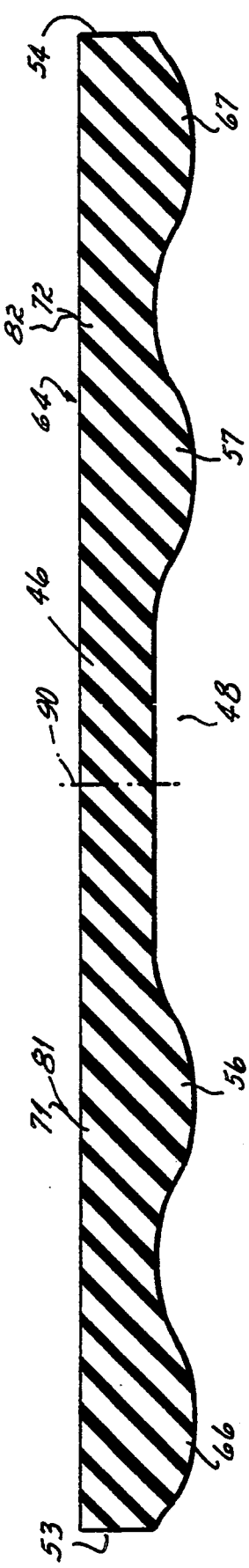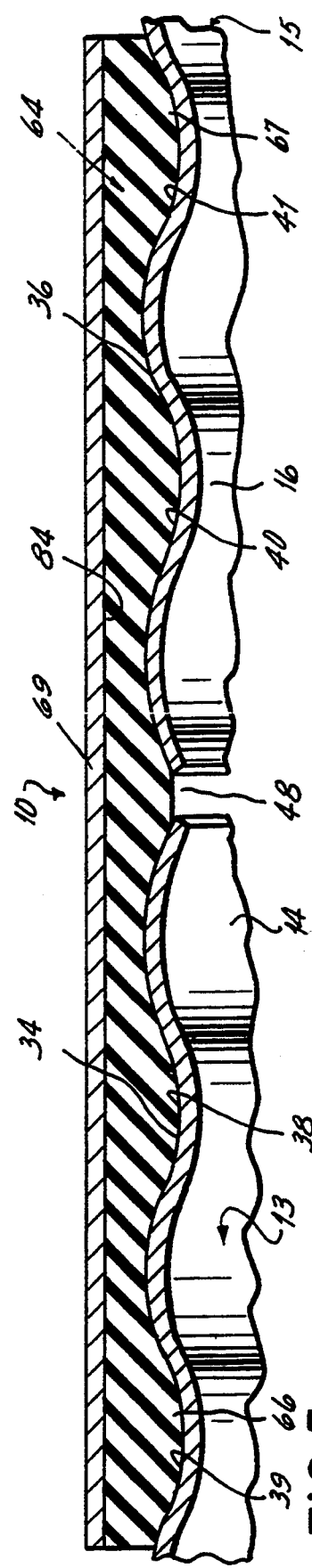

GASKETS USED IN JOINING CORRUGATED PIPE

FIELD OF THE INVENTION

The present invention relates to elastomeric gaskets, and more specifically to gaskets for sealing a joint between two pipes, such as corrugated storm sewer pipe.

BACKGROUND OF THE INVENTION

It is known to join two pipes together end-to-end by forming a joint between a circumferentially adjustable annular band and the ends of the two pipes. Typically, the annular band used in these joints has two end edges and two annular side edges. When the band is circumferentially adjusted, the two end edges move relative to one another. Such joints have been sealed by trapping an elastomeric gasket between an outside surface of the two pipe ends and an inside surface of the annular band.

These joints have been used to join annularly grooved ends of corrugated pipe in storm sewer systems. The annular band typically used with such corrugated pipe has a generally flat inside surface between two annular ribs, one rib running alongside each side edge. These two annular ribs are spaced far enough apart to mate with one annular groove on each pipe end to help prevent the resulting joint from being pulled apart. The joints in storm sewer systems are generally expected to withstand water pressures up to a maximum of about 15 psi with only minimal leakage allowed. Two types of gaskets have been used to seal the joints of such systems, O-ring gaskets and flat gaskets. A typical O-ring gasket has a continuous O-shape, with a circular cross-section. A typical flat gasket has a flat top and bottom surface that are generally parallel and two side edges, giving the gasket a generally rectangular cross section.

When O-ring gaskets are used to seal such storm sewer pipe joints, at least two gaskets are used, with each gasket being seated in one of the annular grooves on each pipe end. When the joint is formed, each O-ring gasket is positioned between its respective annular groove and a portion of the flat inside surface of the band. One advantage of using O-ring gaskets is that they can be pre-positioned on the pipe end before the joint is assembled in the field. However, one drawback is that the O-ring gaskets, by themselves, do not provide a complete seal for the joint. Reducing the circumference of the annular band compresses each O-ring gasket between only a trough portion of its respective annular groove and a portion of the inside flat surface of the annular band. Additional steps must be taken to separately seal the two end edges of the annular band when O-ring gaskets are used. This can be accomplished by applying a sealant between the two end edges.

Unlike the O-ring gaskets, the single piece flat gasket is used, when the flat gasket is used, the flat gasket forms a seal in the joint by being circumferentially extended completely around both of the pipe ends, with the side edges of the gasket extending out beyond at least a portion of the annular grooves on each pipe end which mate with the two annular ribs on the band. Thus, no separate steps are required to seal the end edges of the annular band. A portion of the gasket along each side edge is sandwiched between one of the annular band ribs and its mating annular pipe groove. The balance of the bottom surface of the flat gasket between the two band ribs usually only contacts upper or crest portions between adjacent annular grooves of each pipe end.

While O-ring and flat gaskets are commonly used for such pipe joints, they do not consistently provide the seal integrity (i.e. tightness) desirable for such pipe joints. Pipe joints formed with these gaskets are known to leak. Therefore, there is a need to provide a gasket which more reliably seals such pipe joints or at least allows only minimal leakage.

SUMMARY OF THE INVENTION

This invention is directed to an elastomeric gasket which will provide a better seal in a joint between an annular band and annularly grooved ends of two lengths of pipe positioned end-to-end. An elastomeric gasket of the present invention forms an adequate seal in such a joint with the same compressive force being exerted by the annular band.

According to this invention, a profile gasket is provided for forming a seal in a joint between an annular band and annularly grooved ends of two pipes positioned end-to-end. The profile gasket comprises a sheet of elastomeric material having a bottom surface with at least two integrally molded and laterally spaced ridges running along its length. The bottom surface is adapted to form a seal in the joint by being circumferentially extended completely around both of the pipe ends, with one of the ridges disposed in an annular groove at each pipe end. The bottom surface of the sheet is then compressed against an outside surface of the two pipe ends and trapped between the annular band and pipes by reducing the circumference of the adjustable annular band. With these ridges on the bottom surface, the gasket has more surface area to contact and seal against the pipe ends. Because there is more surface area in contact, the seal formed will be less affected by irregularities in the shape of the annular grooves at each pipe end. In addition, the closer the profile of the bottom surface of the sheet matches the profile of the outside surface of the two pipe ends, the less compressive force, by the annular band, is required to form an adequate seal.

In one embodiment of the present invention, the gasket has at least two seating portions, with each seating portion extending laterally from one of the integrally molded ridges. A gasket with such seating portions is preferably used with an annular band having annular ribs. Each of these seating portions is adapted for disposition between such a rib formed in the annular band and an annular groove at the pipe ends.

In another embodiment, the gasket sheet comprises two longitudinal pieces with each piece having integral ridges for sealing the joint. Like the O-ring gaskets, using two such pieces would require separate steps to seal the end edges of the annular band but would also allow each gasket piece to be pre-positioned on each pipe end before the pipe joint is formed in the field. However, such a two-piece gasket sheet with integrally-formed ridges would also seal better than two standard O-ring gaskets or even a two piece flat gasket, because there is still greater surface area making sealing contact between the band and the pipe ends than that found with standard O-rings or flat gaskets The objectives features and other advantages of the present invention will become apparent upon consideration of the detailed description and appended drawings.

BRIEF DESCRIPTION OF THE DRAWINGS

FIG. 2 is a cross-section of the gasket of FIG. 1 trapped between an annular band section and annularly grooved ends of two pipe sections;

FIG. 4 is a cross-section of another embodiment of the present invention; and

FIG. 5 shows a partial cross-section of the gasket of FIG. 4 forming a seal in a joint.

DETAILED DESCRIPTION OF THE INVENTION

Figures 1, 3:
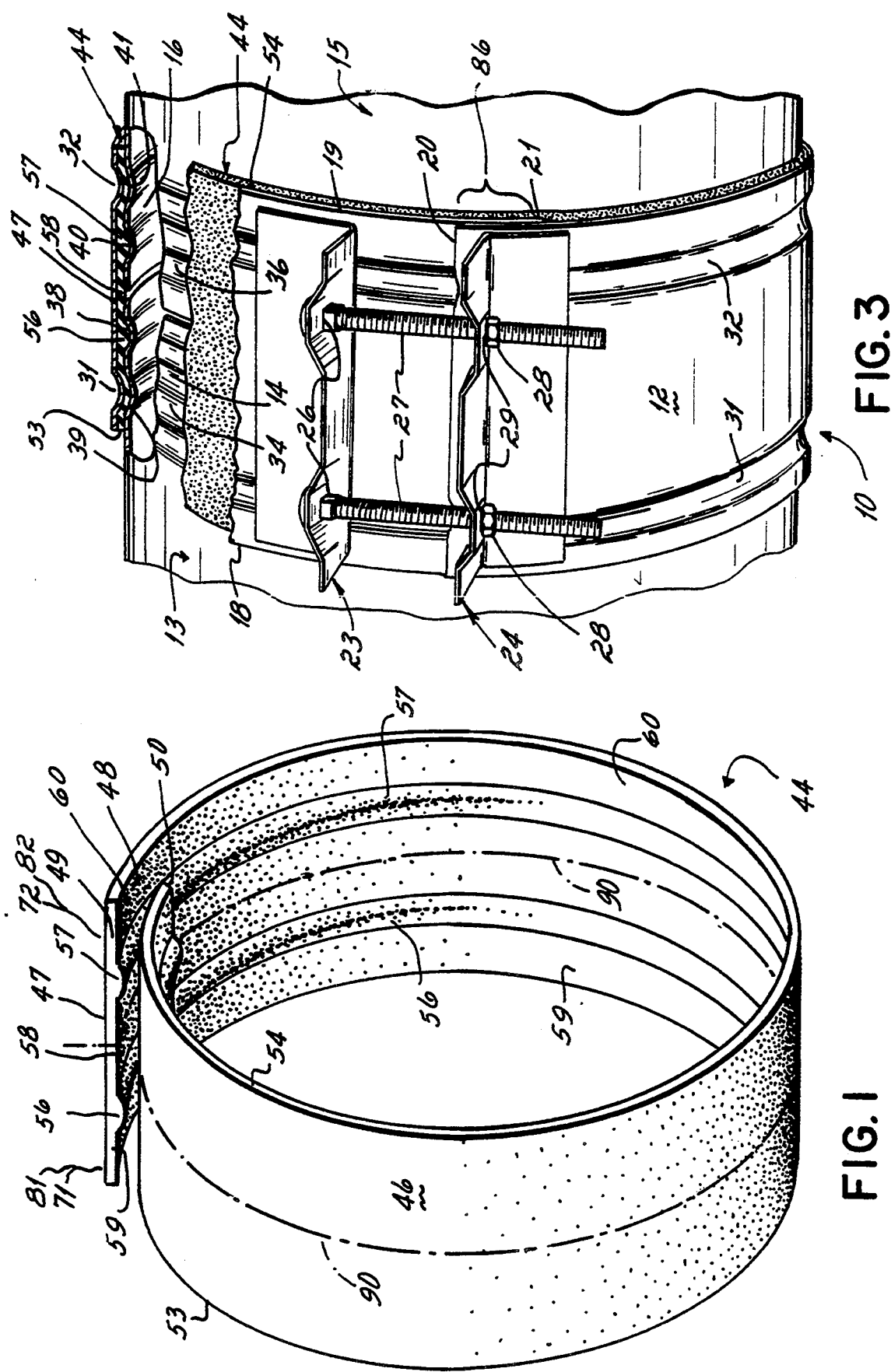
FIG. 1 is a perspective view of one embodiment of an elastomeric gasket of the present invention.
FIG. 3 is a perspective view, partially broken away showing the gasket of FIG. 1 forming a seal in a joint.

FIGS. 1-3 show a joint 10 between a circumferentially adjustable annular band 12 and a first pipe 13 having a first pipe end 14 and a second pipe 15 having a second pipe end 16, with the pipe ends 14 and 16 generally abutting each other. The annular band 12 has a first side edge 18, a second side edge 19, and a first end 20 overlapping a second end 21. A first adjusting bracket 23 is mounted adjacent to the first end 20 and a second adjusting bracket 24 is mounted adjacent to the second end 21. The first bracket 23 has two square holes 26, with each hole 26 receiving the square shank of a carriage bolt 27. The second bracket 24 has two holes 29, with each hole 29 receiving one of the bolts 27 such that the distal end of each bolt 27 protrudes through one of the holes 29. The protruding distal end of each of the bolts 27 has a hex nut 28 threaded thereon. A first rib 31 runs along the length of the first side edge 18 of the band 12, and a second rib 32 runs along the length of the second side edge 19 of the band 12. Each pipe end 14 and 16 has an outside surface 34 and 36, and is corrugated with an inner annular groove 38 and 39 and an outer annular groove 40 and 41, respectively. The annular band 12 is wide enough to telescope over the inner and outer annular groove of each pipe end 14 and 16.

Referring to FIG. 1, an elastomeric profile gasket 44 adapted for forming a seal in the joint 10 comprises a generally rectangular sheet 46 of extruded or molded rubber material having a top surface 47, a bottom surface 48, two end edges 49 and 50, a first side edge 53 and a second side edge 54. The sheet 46 is preferably made of closed-cell rubber material, but could also be made of solid rubber. The sheet 46 has a width from side edge to side edge generally equal to that of the annular band 12. The top surface 47 is relatively flat and the bottom surface 48 has a first integrally molded ridge 56 and a second integrally molded ridge 57 laterally spaced on either side of a flat portion 58. Each ridge 56 and 57 runs along the length of the bottom surface 48 from one end edge 49 to the other end edge 50. A first seating portion or strip 59 extends from the first ridge 56 laterally out to the first side edge 53, and a second seating portion or strip 60 extends from the second ridge 57 laterally out to the second side edge 54. The top surface 47 and bottom surface 48 of the flat portion 58 and the two seating portions 59 and 60 are generally flat and each portion 58, 59 and 60 has about the same thickness.

Referring to FIG. 2, the joint 10 can be sealed by lining up the first ridge 56 with the inner annular groove 38 on the first pipe end 14, and the second ridge 57 with the inner annular groove 40 on the second pipe end 16. The first seating strip 59 is aligned with and dimensioned to extend out over the outer annular groove 39 on the first pipe end 14, and the second seating strip 60 is aligned with and dimensioned to extend out over the outer annular groove 41 on the second pipe end 16. The sheet 46 is then circumferentially wrapped completely around both pipe ends 14 and 16, with the two end edges 49 and 50 adhesively, or otherwise, bonded together to form the sheet 46 into an integral tube surrounding both pipe ends 14 and 16. Alternatively and preferably, the two end edges 49 and 50 can be bonded together initially to form the gasket 44 into the tube shape. Being made of rubber, the now tubular gasket is then pulled over each of the pipe ends until it is aligned and positioned as described above. Preferably, the ridges 56 and 57 are dimensioned to be in contact with the entire outside surface 34 and 36 of their respective inner annular grooves 38 and 40 when the gasket 44 is in place around both pipe ends 14 and 16. The annular band 12 is then circumferentially positioned around the now tubular sheet 46, with its first rib 31 positioned over the outer annular groove 39 of the first pipe end 14 and its second rib 32 positioned over the outer annular groove 41 of the second pipe end 16. The annular band 12 can be adjusted to reduce its circumference by tightening the two bolts and nuts 27, 28 thereby pulling the two adjusting brackets 23 and 24 together.

As the circumference of the annular band 12 is reduced, the profile gasket 44 is compressed between the annular band 12 and the outside surface 34 and 36 of each pipe end 14 and 16. Continuing to adjust the annular band 12 in this manner results in the bottom surface 48 of the sheet 46 sealing against the outside surface 34 and 36 of the annularly grooved pipe ends 14 and 16. Preferably, the annular band 12 is adjusted until all or most of the bottom surface 48 of the sheet 46 is in sealing engagement or contact with the outside surface 34 and 36 of the two pipe ends 14 and 16. At this point, the seating strips 59 and 60 are compressed or sandwiched between the annular band ribs 31 and 32 and the outer annular grooves 39 and 41 of the pipe ends 14 and 16, respectively. Preferably, the seating strips 59 and 60 are dimensioned to fill all of the space between the ribs 31 and 32 and the outer annular grooves 39 and 41. Sandwiching the seating strips 59 and 60 in this manner improves the seal integrity of the joint 10 compared to such a joint using a gasket 44 without seating strips 59 and 60.

FIG. 4 shows another profile gasket 64 which is similar to the previously described embodiment (see FIGS. 1-3) except that the bottom surface 48 of the sheet 46 has an additional first ridge 66 and second ridge 67 instead of the seating portions 59 and 60. The additional first ridge 66 is located between the first ridge 56 and the first side edge 53 of the sheet 46. The additional second ridge 67 is located between the second ridge 57 and the second side edge 54 of the sheet 46. Referring to FIG. 5, this profile gasket 64 is used to form a seal in the joint 10 in the same manner as previously described except that the additional first ridge 66 is positioned in the outer annular groove 39 of the first pipe end 14 and the additional second ridge 67 is positioned in the outer annular groove 41 of the second pipe end 16. In addition, unlike the previous embodiment, the annular band 69 used with the gasket 64 is flat with no ribbing.

Typically, in the storm sewer pipe industry, the joint strength and seal tightness requirements are specified by a customer. When the flat annular band 69 is used in the joint 10, the joint is not as strong as when the ribbed annular band 12 is used. However, the integrity or tightness of the seal is still dependent upon the amount of surface contact between the bottom surface 48 of the sheet 46 and the outside surface 34 and 36 of the two pipe ends 14 and 16. Thus, as with profile gasket 44, the integrity of the seal can be increased by increasing the number of ridges and annular grooves that are in contact.

Each gasket embodiment 44 and 64 comprises a first section 71 for sealing to the first pipe end 14 and a second section 72 for sealing to the second pipe end 16. If desired, each of these gaskets 44 and 64 can be modified by cutting, or otherwise separating, the sheet 46 into a first piece 81 and a second piece 82 corresponding to the two sections 71 and 72 (the cut line 90 being shown in phantom in FIGS. 1, 2 and 4). Each piece 81 and 82 of gasket 44 has a generally T-shape cross section. Each piece 81 and 82 of gasket 64 has a generally double T-shape cross section (See FIG. 4). To seal the joint 10 using this modification, not only would the bottom surface 48 of each of the gasket pieces 81 and 82 have to seal against the outer surface 34 and 36 of its corresponding pipe end 14 and 16, the top surface 47 of each gasket piece 81 and 82 would also have to seal against an inside surface 84 of the annular band 12 and 69. In addition, the annular band 12 and 16 itself would have to be separately sealed along a length 86 of its overlapping end edges 20 and 21 not sealed by either gasket piece 81 and 82. However, if installing a single gasket in the field is not practicable, separating the gasket into two pieces 81 and 82 allows each piece to be installed on one of the pipe ends 14 and 16 before being taken out into the field.

By shaping the bottom surface 48 of the sheet 46 to more closely conform to the outside surface 34 and 36 of the two pipe ends 14 and 16, profile gaskets according to the present invention are able to form a tighter and more reliable seal than that obtainable with prior flat or O-ring gaskets.

A number of tests have been conducted comparing the performance of present profile gaskets and prior art flat and O-ring gaskets in sealing such joints between two annularly grooved ends of corrugated storm sewer pipes. According to these tests, the joints formed with profile gaskets according to the present invention performed better than similar joints formed with the flat and O-ring gaskets. The present profile gaskets resisted higher pressures before leaking, and those seals that did leak leaked at a slower rate than either of the flat or O-ring prior art gaskets. The present profile gaskets even resisted higher pressures before leaking compared to a flat gasket used with an annular band having matching annular ribs aligned with each of the inner and outer grooves on each pipe end.

A variety of natural or synthetic rubbers such as neoprene or ethylene propylene diene monomer (EPDM) could be used as the gasket material. The gaskets used in the above tests were made of extruded closed-cell neoprene.

It will be understood that various modifications can be made to this invention without departing from the spirit and scope of it. Therefore, the limits of this invention should be determined from the appended claims.

What is claimed is:

1. A pipe joint assembly comprising:
   a circumferentially adjustable annular band for adjustment around two pipe ends to form a joint between said ends,
   a first pipe and a second pipe, each of said pipes having an annularly grooved first end, each of said first ends adapted for partially telescoping into said annular band, and
   a single sheet of elastomeric material having a bottom surface, with at least two integrally molded and laterally spaced ridges running lengthwise along said bottom surface,
   said bottom surface adapted for forming a seal against an outside surface of the first end of each of said pipes by circumferentially extending said sheet completely around the annularly grooved end of each of said pipes and trapping said sheet between said pipes and said annular band, with one of said ridges adapted for disposition in an annular groove at the first end of said first pipe and another of said ridges adapted for disposition in an annular groove at the first end of said second pipe.

2. The pipe joint assembly of claim 1 wherein said sheet includes at least two seating portions, each of said seating portions extending laterally from one of said ridges, one of said seating portions adapted for disposition between a first rib formed in said annular band and an annular groove at the first end of said first pipe, and another seating portion adapted for disposition between a second rib formed in said annular band and an annular groove at the first end of said second pipe.

3. The pipe joint assembly of claim 1 wherein each of said ridges is adapted for sealing engagement with the entire outside surface of an annular groove, when said bottom surface forms a seal against the outside surface of the first end of each of said pipes.

4. The pipe joint assembly of claim 1 wherein said sheet is sized to substantially conform to the size of the annular band.

5. The pipe joint assembly of claim 1 wherein said sheet has two end edges bonded together for said bottom surface to form a seal against the outside surface of the first end of each of said pipes.

6. The pipe joint assembly of claim 1 wherein said sheet is in the form of an integral tube.

7. The pipe joint assembly of claim 1 wherein said gasket is made from an extruded closed-cell rubber material.

8. The pipe joint assembly of claim 1 wherein the bottom surface of said sheet has four integrally molded and laterally spaced ridges, with two of said ridges each being adapted for disposition in separate annular grooves at one end of the first pipe and two other of said ridges each being adapted for disposition in separate annular grooves at one end of the second pipe.

* * * * *